United States Patent [19]
Stephan et al.

[11] Patent Number: 5,313,832
[45] Date of Patent: May 24, 1994

[54] COMPOSITE MASS AIR FLOW SENSOR

[75] Inventors: Craig H. Stephan, Ann Arbor; Margherita Zanini-Fisher, Bloomfield Township, Oakland County, both of Mich.

[73] Assignee: Ford Motor Company, Dearborn, Mich.

[21] Appl. No.: 812,396

[22] Filed: Dec. 23, 1991

[51] Int. Cl.$^5$ .............................................. G01F 1/68
[52] U.S. Cl. .................................................. 73/204.26
[58] Field of Search ........... 73/204.15, 204.23, 204.25, 73/204.26, 204.27; 338/25

[56] References Cited

U.S. PATENT DOCUMENTS

| | | | |
|---|---|---|---|
| 4,472,239 | 9/1984 | Johnson et al. | |
| 4,594,889 | 6/1986 | McCarthy | |
| 4,677,850 | 7/1987 | Miuro et al. | 73/204.15 |
| 4,771,271 | 9/1988 | Zanini-Fisher | |
| 4,808,549 | 2/1989 | Mikkor et al. | |
| 4,843,445 | 6/1989 | Stemme | |
| 4,870,860 | 10/1989 | Ohta et al. | |
| 4,930,347 | 6/1990 | Henderson | 73/204.25 |
| 4,934,190 | 6/1990 | Lee | 73/204.26 |
| 5,201,221 | 4/1993 | Forgacs | 73/204.26 |

FOREIGN PATENT DOCUMENTS

89/03512 5/1989 PCT Int'l Appl.

OTHER PUBLICATIONS

Ford Motor Company Technical Report No. SR 89-160 *Functional Behavior of a Batch-Fabricated Monolithic Silicon Mass Air Flow Sensor*, C. H. Stephan, Jan. 23, 1990.

IEEE Publication No. 0018-9383/86/1000-1470$1.00 "A Monolithic Gas Flow Sensor with Polyimide as Thermal Insulator", Goran N. Stemme, *IEEE Transactions on Electron Devices*, vol. ED-33, No. 10, Oct. 1986.

Smith, R. L. et al, "An Integrated Sensor for Electrochemical Measurements," *IEEE Transactions on Biomedical Engineering*, vol. BME-33, Nos. 2, Feb., 1986, pp. 83–90.

C. H. Stephan and M. Zanini, *A Micromachined, Silicon Mass-Air-Flow Sensor For Automotive Applications;* (undated).

*Primary Examiner*—Herbert Goldstein
*Attorney, Agent, or Firm*—Allan J. Lippa; Roger L. May

[57] ABSTRACT

A mass air flow sensor (MAFS) is disclosed wherein silicon members carrying a resistive film are bonded to a glass substrate and extend out over an air flow opening through the glass substrate. The silicon members may be either bridges across the air flow opening or cantilevered beams having one end bonded to the substrate and a second free end. Silicon frames around the air flow opening can also be provided, to which an environmental seal can be formed. A novel method of making such sensors includes providing the glass substrate with the air flow opening therethrough and aligning thereover a silicon wafer selectively passivated to define the silicon member(s) and any frame element. The glass and silicon wafers are bonded and subsequently anisotropically etched, after which the resultant bonded and etched assembly can be employed in accordance with known mounting techniques.

11 Claims, 4 Drawing Sheets

COMPOSITE MASS AIR FLOW SENSOR

BACKGROUND OF THE INVENTION

This invention relates to mass air flow sensors for measuring the mass flow of air or other fluid. The invention relates also to methods of making such sensors, including batch fabrication methods.

Mass air flow sensors employing the principle of hot film anemometry are well known for use in instrumentation applications, including especially various process control applications. Typically, electrical current is used to maintain a resistor film at a certain temperature above the temperature of the air flow by electronic sensing and feedback circuits. The electronic circuit senses changes in heat transfer rate to the air flow. Such sensors are used for measuring the mass of a fluid flow, for example, the mass of air flowing in an air conditioning system, the air intake of a motor vehicle engine, gas chromatography eluted gas flows, etc. One such mass air flow sensor (MAFS) is that shown in U.S. Pat. No. 4,594,889 to McCarthy, the disclosure of which is incorporated herein by reference. The McCarthy device is a so-called monolithic silicon mass air flow sensor (SiMAFS), preferably batch fabricated by chemically etching ("micromachining") 100-millimeter (4-inch), oriented single-crystal silicon wafers. The silicon wafer is typically about 600 μm thick, the top and bottom surfaces being (100) crystallographic planes. The McCarthy patent discloses MAFS having an air flow opening formed through a silicon substrate. Elongate silicon members bridge across the air flow opening and carry platinum metal coatings exposed to the air flow for use as the sensor's hot wire and temperature sensing wire. Conductive terminals at the ends of the silicon members are in electrical contact with the metal coatings. An integrated circuit associated with the silicon chip generates a signal corresponding to the mass air flow. The MAFS of the McCarthy patent is especially suitable for use in measuring the mass of air introduced into an automobile engine. For such application, the MAFS would be located typically between the air cleaner and the engine throttle body.

A recognized difficulty concerning MAFS of the type disclosed in the McCarthy patent is the excellent thermal linkage between the main silicon chip and the silicon members unitary therewith which bridge across the air flow opening carrying the metal resistor films. This thermal linkage imposes a constraint on the size of the silicon members. For silicon members larger than about 50 μm across, the heat loss to the chip via conduction becomes significantly large. This reduces the sensitivity of the sensor and requires greater power levels for operation of the sensor. Temperature compensation is also made more difficult. The influence of changes in chip temperature on the accuracy of measurement is increased. While these difficulties can be reduced by making the silicon members smaller in cross-sectional area, they then become more fragile, perhaps even breaking under the impact of dust particles in air flows of sufficient velocity. In the automotive engine application mentioned above, for example, the sensor preferably can survive and operate under conditions of vibration, temperature extremes, and bombardment by dust and the like for years without requiring service. Thus, for such prior known MAFS, thermal isolation, and hence accuracy, may be compromised with robustness of the sensor.

SUMMARY OF THE INVENTION

The present invention provides a composite mass air flow sensor comprising a glass substrate with an air flow opening through it. A silicon member carrying a resistive film is bonded to the glass substrate and extends out over the air flow opening to expose the resistive film to the fluid flow to be measured. The silicon member may be either a beam cantilevered over the air flow opening from its bond to the surface of the glass substrate or it may bridge the opening, being bonded at one or both ends. Preferably a second silicon member is provided to carry a second resistive film for sensing air flow temperature for temperature compensation.

The silicon member (or each of them, if more than one) employed in the sensor of the present invention is thermally isolated, that is, it is an island of silicon connected to the glass substrate, rather than to a silicon support chip. The glass is ideally quite thin, being, for example, about 700 μm thick, and has intrinsically low thermal conductivity. Because the silicon members are thermally insulated in this way, they can be made substantially thicker than in analogous silicon MAFS, such as that of the aforesaid McCarthy patent, while maintaining good sensor accuracy. The resulting improvement in sensor robustness is a significant advantage since increased robustness of the silicon member for a desired sensor accuracy level provides a more durable sensor. In particular, for example, more robust silicon beams in accordance with the present invention are better able to withstand the impact of dust particles entrained in the air flow being measured by the sensor. In addition, the glass substrate has the desirable property that, unlike silicon, its temperature coefficient of thermal conductivity has the same sign and comparable magnitude as the coefficient for air, aiding in temperature compensation. Finally, as discussed further below, preferred embodiments of the sensor of the present invention can be produced using batch fabrication techniques well known to the IC manufacturing industry. Such techniques provide excellent dimensional control of the silicon elements such that, when properly applied, excellent product yield, cost and efficiency can be achieved.

Especially good thermal isolation is achieved in accordance with certain preferred embodiments of the invention wherein the silicon element or member is bonded at one end to the glass substrate and cantilevered out over the air flow opening from the glass substrate. A cantilevered silicon beam (as opposed to a silicon bridge in accordance with other preferred embodiments of the invention) is more susceptible to damage due to vibration, including resonant frequency vibration of the beam under the influence of the passing air flow. The cross-sectional dimensions of the beam can be larger in accordance with the present invention without unduly sacrificing sensor accuracy, as discussed above. The larger, more robust dimensions reduce or even eliminate such vibration damage. Thus, in the silicon beam embodiments of the invention, further described below, thermal isolation and hence accuracy is achieved in a sensor which is robust and durable.

It is a further advantage of the present invention that the coefficient of heat transfer to air from the silicon member and the coefficient of heat transfer to the glass substrate from the silicon member vary in the same way.

Both coefficients increase with temperature, resulting in enhanced sensor accuracy over a temperature range. This is an improvement over prior art sensors in which the silicon members were unitary extensions from a silicon chip. In those cases, the coefficient of heat transfer from the silicon element to the passing air flow varied oppositely the coefficient of heat transfer from the silicon element to the chip, resulting in an adverse impact on sensor accuracy.

In accordance with a method aspect of the invention, the mass air flow sensors of the invention are produced by providing the glass substrate with an air flow opening formed through it. A bonded assembly is formed by bonding a silicon wafer to the substrate. The silicon wafer has a bottom surface in contact with the upper surface of the substrate and a selectively passivated top surface. The selective passivation of the top surface defines the silicon member or members of the sensor. A first portion of the bottom surface of the silicon member provides a bonding zone overlying an area of the upper surface of the glass substrate. A second portion of the silicon member is positioned over the air flow opening. A resistive film is carried on the surface of the silicon member. The bonded assembly can be made by anodically bonding the silicon wafer to the glass substrate. An etched assembly is then formed by contacting the bonded assembly with an anisotropic etching solution to etch away a selected portion of the silicon wafer, leaving the aforesaid silicon member bonded to the glass substrate and extending out over the air flow opening. The resultant etched assembly can be used in sensor products for a number of applications readily apparent to those skilled in the art in view of the present disclosure. Typically, it is packaged in a sensor housing, the resistive films of the silicon members are connected to associated sensor circuitry and the like, employing techniques well known and readily commercially available to those skilled in the art.

As further described below, the method aspect of the present invention is well adapted to batch fabrication techniques well known in the MAFS and IC manufacturing industry. Properly implemented, batch fabrication methods of the invention provide good product yield, good product consistency, and favorable production costs and efficiency. Additional aspects and advantages of the present invention will be apparent from the following detailed description of certain preferred embodiments of the invention.

DETAILED DESCRIPTION OF CERTAIN PREFERRED EMBODIMENTS

Figure 1:
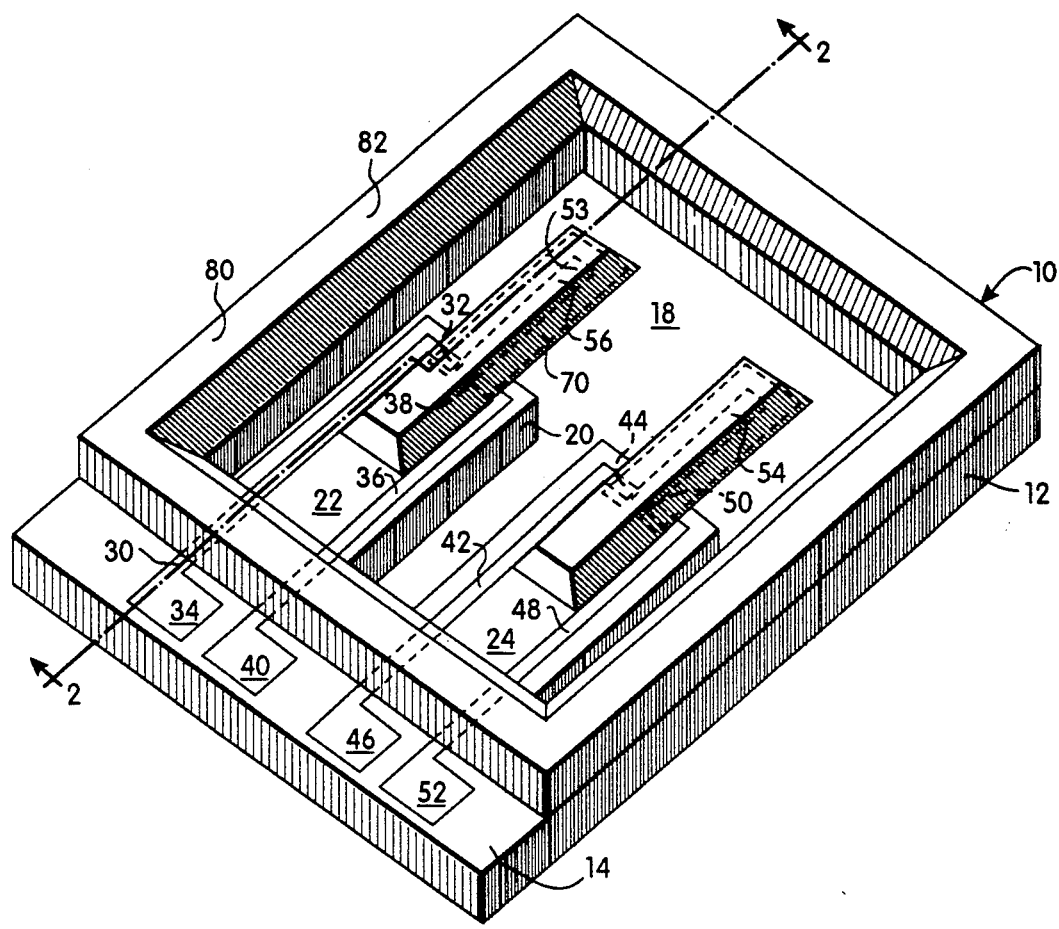
FIG. 1 is a perspective view of a mass air flow sensor in accordance with a preferred embodiment of the invention.

In the discussion below and in the claims which follow it should be understood that all directional terms including, for example, references to an upper or lower surface of a component, are used for convenience and correspond generally to the orientation illustrated in the drawings. Such terms are not meant to limit the invention to any particular configuration or to use in any particular orientation.

Figure 2:
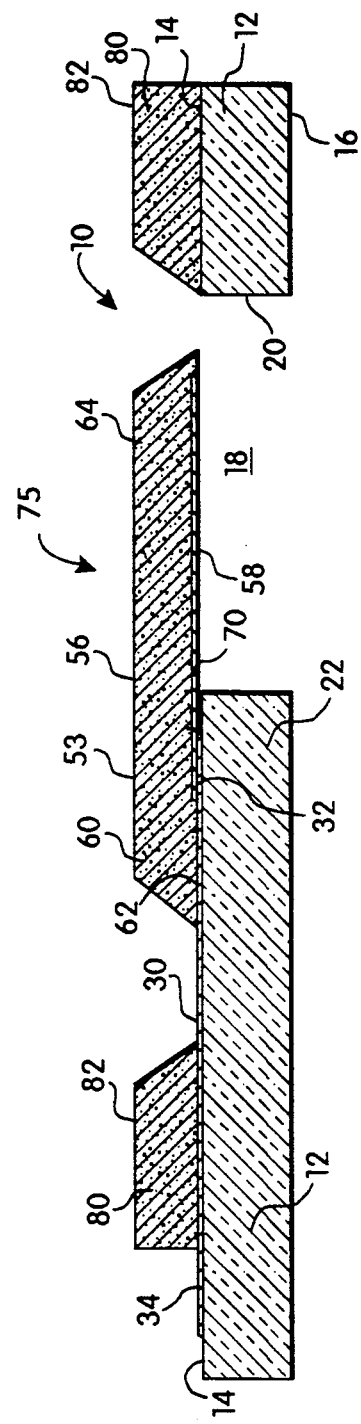
FIG. 2 is a cross-sectional view of the mass air flow sensor of FIG. 1, taken through 2—2 of FIG. 1.

Referring now to FIGS. 1 and 2, mass air flow sensor 10 is seen to comprise a generally planar glass substrate 12 having an upper surface 14, a lower surface 16 and an air flow opening 18 formed therethrough. Air flow opening 18 through the glass substrate has a perimeter 20, the configuration of which forms two elongate peninsulas 22 and 24 extending substantially parallel one another into air flow opening 18. Means for electrically connecting the resistive film of the sensor (described below) comprise an electrically conductive pattern on the upper surface 14 of the glass substrate 12. The pattern is formed preferably of thin film gold over a chrome adhesion layer, thin film aluminum, or other suitable metal by metalization techniques well known to those skilled in the art. In the sensor illustrated in FIGS. 1 and 2, the electrically conductive pattern is seen to comprise a first electrically conductive lead 30 extending on the upper surface 14 of the glass substrate 12 from a first electrical contact point 32 on the first peninsula 22 to a first wire bond pad 34 remote therefrom. A second electrically conductive lead 36 extends on the upper surface 14 of the glass substrate 12 from a second electrical contact point 38 on the first peninsula 22 to a second wire bond pad 40 remote therefrom. The first and second electrically conductive leads are electrically isolated from one another, except that they will be interconnected via circuitry associated with the sensor and via the resistive film carried on the silicon element, as described below. A third electrically conductive lead 42 extends on the upper surface 14 of the glass substrate 12 from a third electrical contact point 44 on the second peninsula 24 to a third wire bond pad 46 remote therefrom. In similar fashion a fourth electrically conductive lead 48 extends on the upper surface 14 of the glass substrate 12 from a fourth electrical contact point 50 on the second peninsula 24 to a fourth wire bond pad 52 remote therefrom. It can be seen that the electrically conductive leads 30 and 36 on the first peninsula are substantially identical to leads 42 and 48 on the second peninsula. The four wire bond pads 34, 40, 46 and 52 are adapted to receive a wire lead or other electrical connection from associated sensor circuitry. Gold wire, for example, can be thermosonically welded to the wire bond pads in accordance with methods well known to those skilled in the art.

Mass air flow sensor 10 further comprises two substantially identical silicon elements 53 and 54. Silicon element 53 is a beam of single-crystal silicon having a planar top surface 56, a planar bottom surface 58 which is wider than its top surface 56 and a trapezoidal cross-section. A trapezoidal cross-section is preferred and can be easily achieved using routine anisotropic etch techniques on a single crystal silicon wafer oriented in the 100 direction. A first portion 60 of beam 53 is positioned over peninsula 22. Specifically, a portion of the bottom surface 58 of the first portion 60 of the beam 53 is bonded at a bonding site 62 on the upper surface 14 of the peninsula 22. A second portion 64 of beam 53, specifically, the free end of beam 52, is cantilevered over the air flow opening 18. This cantilever arrangement provides excellent thermal isolation for the silicon element in the air flow being measured.

Silicon beam 53 carries a first temperature responsive element comprising an elongate resistive film 70 extending on its bottom surface 58. Resistive film 70 can be formed in accordance with well known metalization techniques of any material having suitable thin film resistance properties and suitable deposition characteristics. Preferably the resistive film is formed of nickel or platinum. Resistive film 70 extends from electrical contact with the first electrically conductive lead 30 at the first electrical contact point 32 to the free end of the beam and back, in a U-shaped configuration, to electrical contact with the second electrically conductive lead 36 at the second electrical contact point 38. Preferably the mass air flow sensor 10 would be used in the aerodynamic orientation in the airflow to be measured. Specifically, preferably air would flow through the mass air flow sensor 10 in the direction of arrow 75 shown in FIG. 2. The more narrow upper surface 56 of beam 53 would be presented to the oncoming air flow. This orientation is more aerodynamic, results in better heat transfer from the element to the air flow, and provides protection from impacting dust particles and the like for the resistive film 70 on the leeward surface 58 of the beam. Also, in trapezoidally shaped beams the bottom (i.e., leeward) surface is wider, providing more width for forming the resistive film pattern.

The first portion 60 of the beam 53 should extend back sufficiently on the peninsula 22 from the electrical contacts to achieve compliance of the silicon beam to the surface of the peninsula. The metal films, unless recessed into the silicon and glass surfaces, will cause a slight lift or bump under the beam. That is, the metalization lifts the silicon beam off the glass by the thickness of the metalization. A slight distance, for example a few hundred $\mu$m, is generally sufficient for the facing glass and silicon surfaces to conform sufficiently for anodic bonding. Such distance could be shortened by etching a shallow channel, for example a one $\mu$m deep channel, in the silicon prior to metalization, so that the metalization protrudes little or none above the surface of the silicon. Another alternative in this regard involves the use of a thin metal film spacer at the bonding site. Such spacer could be deposited by well known metalization techniques and would compensate for the height of the circuitry leads between the glass substrate and the silicon. The metalized surface of the bonding site would generally itself form no part of the circuitry of the device. Thus, for example, aluminum or other suitable metal may be used for this purpose, resulting in a silicon/aluminum/glass bond formed during anodic bonding of the silicon to the glass substrate, as described below in connection with the method aspect of the invention.

Silicon beam 54 and its orientation on, and bonding to, peninsula 24 are substantially identical to that described above for beam 53 on peninsula 22. The second beam, alternatively, could extend from the opposite side of the air flow opening, resulting (in certain cases) in better thermal isolation of the heated beam from the ambient sensing beam. In such embodiments, however, the ambient sensing beam is cantilevered from a substrate area somewhat remote from the first beam and, accordingly, possibly of slightly different temperature. There may also be additional sensor beams to serve additional functions, for example, flow direction detection as in U.S. Pat. No. 4,561,303 to McCarthy, the disclosure of which is incorporated herein by reference.

The resistive film can be formed on the silicon by known metalization techniques widely used in the manufacture of IC devices and the like. If necessary, the metalization is passivated, for example with a film of silicon nitride. Such passivation film, however, should be selectively removed at least from regions of the resistive film which will contact electrically conductive leads on the glass substrate surface. Passivation also preferably is removed wherever the silicon is to be anodically bonded to the glass surface.

The mass air flow sensor 10 further comprises a silicon frame 80 bonded to the upper surface 14 of the glass substrate 12 around the air flow opening 18. Significantly, the frame 80 is remote from the first and second silicon beams 53, 54. That is, unlike in previously known MAFS, the silicon beams are not unitary with a surrounding silicon chip into which heat is lost. In such prior known MAFS, the good thermal contact of the silicon element carrying the resistive film in the air flow to the silicon chip caused the temperature along the silicon element in many applications to be approximately parabolic in shape, with the temperature at the ends of the silicon element being nearly equal to that of the silicon frame temperature. In fact, it has been reported in S. Uneo et al "Anti-Dirt Property of Hot-Wire Air Flow Meter," SAE paper 831018 that such previous hot wire MAFS operating at less than about 200° C. are susceptible to contamination by oil and dust entrained in the air flow being measured. Even if the center of the silicon element were heated to well above 200° C., the ends of the silicon member in such prior known devices would be at a lower temperature, creating the potential for dust and oil contamination. In contrast, in the present invention the silicon element is better isolated resulting, especially in certain preferred embodiments, in a temperature profile along the silicon element which is substantially more uniform.

It should be recognized that the silicon frame 80 in the embodiment of FIG. 1 is not essential to the present invention. It is employed in certain preferred embodiments, and can be formed from the same silicon wafer used for creating silicon beams 53 and 54. In fact, although not essential, the thickness of silicon beams 53 and 54 preferably is the same as that of silicon frame 80, all having been etched from a silicon wafer of uniform thickness. The silicon frame 80 is bonded to the upper surface 14 of glass substrate 12. A good environmental seal can be formed to upper surface 82 of frame 80 in accordance with methods well known to those skilled in the art. Thus, for example, silicon rubber or epoxy can be employed in making an environmental seal to frame 80. In addition, the silicon frame 80 can be extended to carry associated sensor circuitry. That is, in accordance with certain embodiments of the invention such ancillary circuitry is provided as an IC circuit on the surface of an extended portion of frame 80. An associated IC circuit can be supported in close proximity, with electrical contact being made from the circuit to bonding pads 34, 40, 46 and 52. Optionally, the mass air flow sensor 10 further comprises a passivating coating on all or selected portions of the surface thereof. The sensor may also have a coating of polyimide or other coating material.

In one preferred embodiment of the invention, a mass air flow sensor suitable for use between the air cleaner and the air intake throttle of a motor vehicle engine as a component of an engine air and fuel management system employs a sensor substantially as shown in FIG. 1 wherein single-sided anisotropic etch of a 400 micron thick silicon wafer yields beams 400 microns thick, each having a top, more narrow surface 53 and 54 about 60-200 microns wide and a lower, wider surface about 600-800 microns wide.

Particularly where cantilevered beams are employed, it is not essential in all applications that a silicon frame, if used at all, extend completely around the air flow openings. Rather, it would be practical in certain applications that a frame be provided only at the base of the cantilevers and optionally at the sides. This has the advantage of allowing a smaller silicon chip size and, in addition, the cantilevered beam can be oriented such that the axes of the beams are parallel to the air flow, rather than perpendicular thereto. Such orientation can reduce the cross-sectional area of the beam normal to the air flow, thus reducing dust impact and also reducing the lever arm caused by dust particle impact near the free end of the beam.

Figure 3:
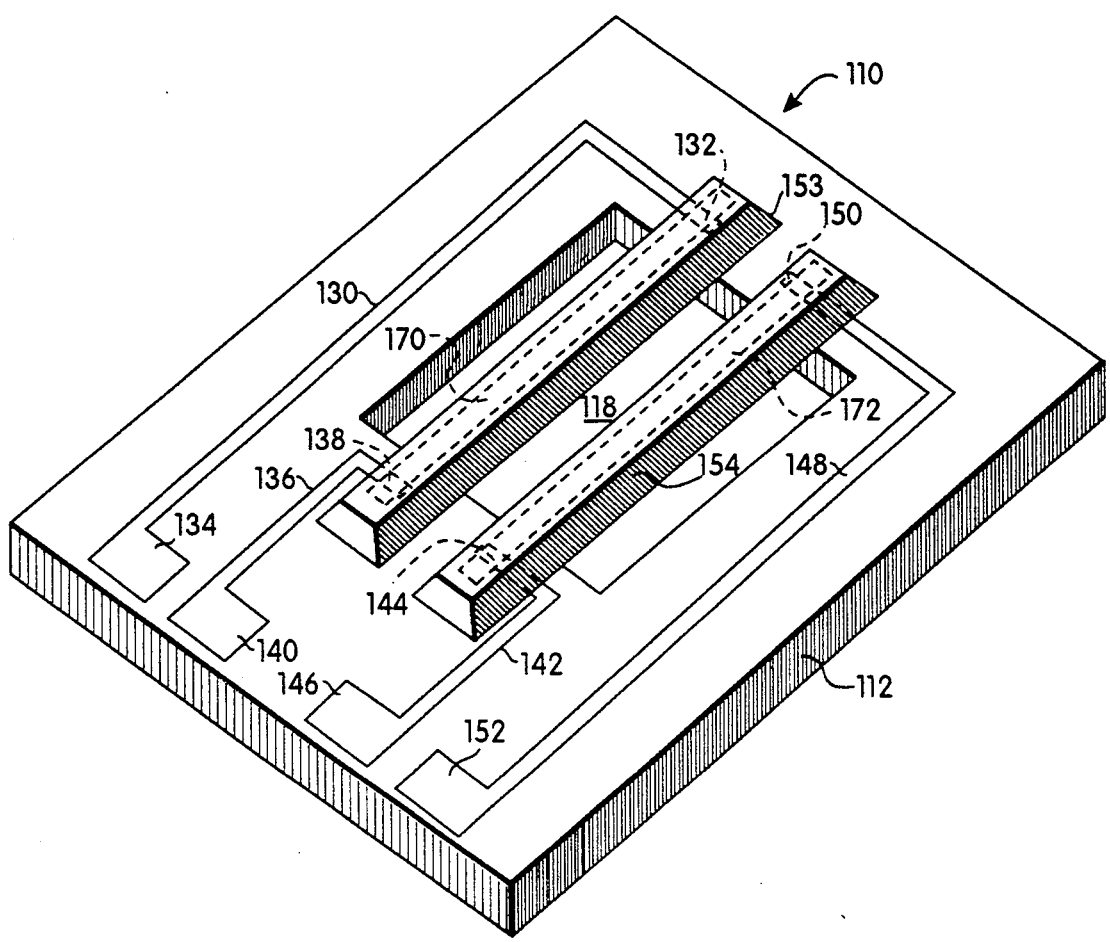
FIG. 3 is a perspective view of a mass air flow sensor in accordance with a second preferred embodiment of the invention.

In certain alternative preferred embodiments, the silicon member bridges the air flow opening, rather than having a free end cantilevered over the opening. Referring now to FIG. 3, a mass air flow sensor 110 is shown to have a glass substrate 112 having an upper surface 114. Upper surface 114 is metalized in a pattern comprising four electrically conductive leads similar to those illustrated in the embodiment of FIGS. 1 and 2. Specifically, a first lead 130 extends from a first electrically conductive pad 132 to a first wire bond pad 134. A second electrically lead 136 extends from a second electrically conductive pad 138 to a second wire bond pad 140. A first silicon element 153 forms a bridge over the air flow opening 118. The bottom or leeward side of silicon element 153 is metalized to form a resistive film 170 similar to resistive film 70 in the embodiment of FIGS. 1 and 2. Resistive film 170, however, extends substantially straight from electrical contact with the first electrically conductive lead 130 at its electrically conductive pad 132 to electrical contact with the second electrically conductive lead 136 at the second electrically pad 138.

The second silicon element 154 is substantially identical to silicon element 153. It extends across air flow opening 118 spaced from, and substantially parallel to, silicon element 153. Also, its bottom surface is metalized to provide a resistive film 172 substantially identical to resistive film 170 described above. Resistive 172 is connected to electrical leads 142 and 148 at first and second electrically conductive pads 144 and 150, respectively. Leads 142 and 148 provide corresponding wire bond pads 146 and 152, respectively.

As in the case of the embodiment illustrated in FIGS. 1 and 2, the MAFS shown in FIG. 3 optionally further comprises a frame extending either completely or partially around the perimeter of air flow opening 118. It will also be appreciated that the perimeter of air flow opening 118 optionally could be configured to provide peninsulas to receive one or both ends of the silicon bridge members. The silicon bridge members are bonded to the upper surface 114 of the glass substrate 112 at either end or, preferably, both ends. As in the previous embodiment, the silicon members preferably are anodically bonded to the glass substrate, although alternative bonding means such as, for example, epoxy adhesive bonding, can also be employed.

In accordance with the method aspect of the invention, a generally planar glass substrate is provided with an air flow opening therethrough. The air flow opening can be made by any of several processes well known to those skilled in the art, such as, for example, laser cutting, ultrasonic machining and etching. A selectively passivated silicon wafer also is provided, having a resistive film, preferably nickel or platinum, on either the top or bottom surface of the wafer. The resistive film would extend from a first contact point to a second contact point in a straight, U-shaped or other configuration suitable to the design of the sensor.

A bonded assembly is formed by bonding the silicon wafer to the glass substrate such that at least a first portion of the bottom surface of the wafer bonds to the upper surface of the substrate at a bonding site, and at least a portion of the resistive film is aligned over the air flow opening. Anodic bonding in accordance with known techniques is preferred for such bonding operation. An etched assembly is then formed by contacting the bonded assembly with an anisotropic etching solution to etch away selected portions of the silicon wafer, leaving at least one silicon element bonded to the glass substrate at the aforesaid bonding site and supporting the resistive film over the air flow opening. That is, the anisotropic etching step leaves the one or more silicon beams or bridges extending over the air flow opening and also any silicon frame member of the device. Where the surface of the glass substrate has been metalized to form wire bond pads, as described above, the etching step will remove the silicon wafer from above such wire bond pads. The etched assembly can then be employed in accordance with known techniques. Such further steps may in certain applications include application to the etched assembly of a coating, such as a coating of nonconductive polymer, for example, polyimide.

Figure 4A:
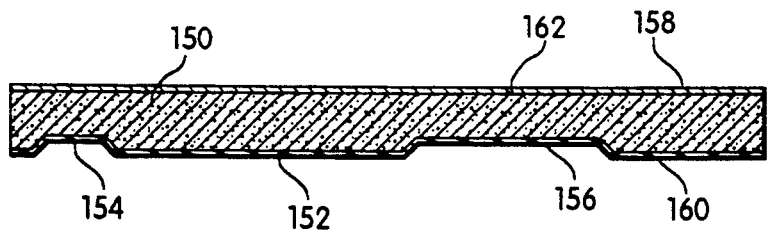
FIGS. 4A–4E illustrate steps of a preferred embodiment of the method of the invention.
Figure 4B:
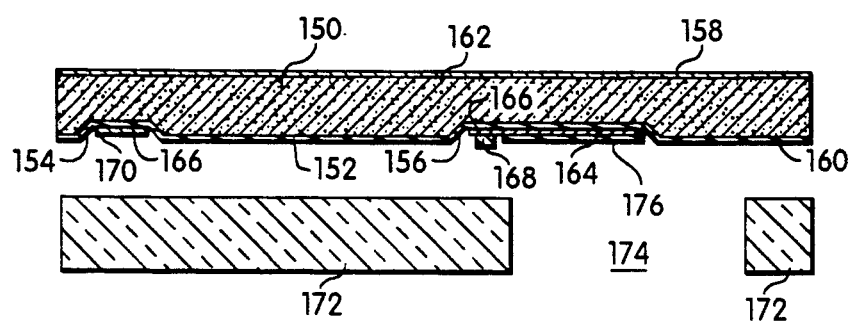

Referring now to FIGS. 4A-4E, sequential steps for fabrication of a mass air flow sensor in accordance with the present invention are illustrated. Specifically, FIG. 4A illustrates a silicon wafer 150 on the bottom surface 152 of which trenches 154 and 156 have been plasma etched. Oxide/nitride passivation layers 158 and 160 have been formed on top surface 162 and bottom surface 152 of the silicon wafer 150. In FIG. 4B the wafer has been metalized. Specifically, resistive thin film 164 has been formed in trench 156 and will ultimately be on the bottom surface of a cantilevered beam over an air flow opening in the device. The resistive film 164 preferably is nickel or platinum. A second metalization step has deposited an electrically conductive aluminum lead 166 extending from an electrical contact pad 168 to a wire bond pad 170. The electrically conductive aluminum lead 166 is in electrical contact with the resistive film 164 at the electrical contact pad 168. FIG. 4B further shows planar glass substrate 172 with ultrasonically drilled air flow opening 174 therethrough. The resistive film 164 has been passivated by passivation layer 176.

Figure 4C:
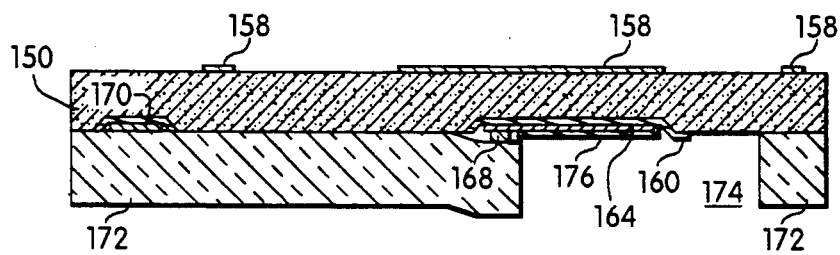
Figure 4D:
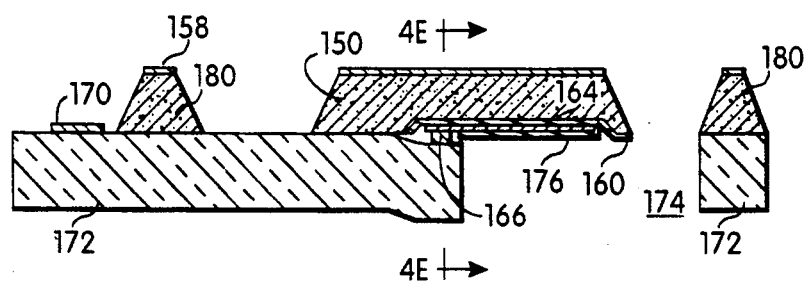
Figure 4E:
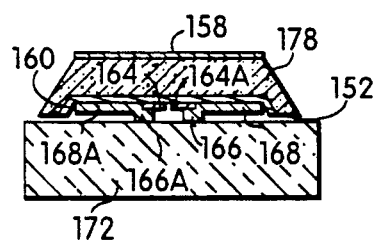

In FIG. 4C the passivation layers 158 and 160 have been selectively removed from the top surface 162 and bottom surface 152, respectively, of the silicon wafer 150. FIG. 4C shows the silicon wafer 150, aluminum lead 166, and the glass substrate 172 anodically bonded together. In FIG. 4D the bonded assembly of FIG. 4C has been anisotropically etched to delineate the silicon beam 178 and silicon frame 180, and to expose wire bond pad 170. It can be seen that silicon beam 178 is cantilevered over air flow opening 174, with resistive film 164 extending out on the bottom surface of the beam over the air flow opening. FIG. 4E shows silicon beam 178 viewed in the direction of 4E—4E in FIG. 4D. Resistive film 164 is U-shaped on the bottom surface 152 of the beam and thus has two terminal ends 164A and 164B. Terminal 164A is seen to contact electrical contact point 168 of aluminum lead 166, while the second terminal end 164B contacts an electrical contact point 168A of a second aluminum lead 166A.

In accordance with a highly preferred embodiment of the method aspect of the invention, a batch manufacturing method is provided for making a plurality of substantially identical mass air flow sensor components. The method comprises providing a generally planar glass substrate wafer, for example, three to four inches in diameter, having a plurality of substantially identical air flow openings, for example openings of about 6 mm by 8 mm with peninsulas as described above, formed in rows and columns in the glass substrate. The surface of the glass substrate is metalized to provide electrically conductive leads, for example as shown in the embodiment illustrated in FIGS. 1 and 2. The glass surface can be metalized, for example, by evaporation of a chrome adhesion film followed by a gold film through a metal mask. Alternative metals also are suitable, although ideally the regions of the leads which will contact the resistive film carried by the silicon member is made of some metal such as gold which will interdiffuse during the high temperatures and pressures encountered during the anodic bonding process, thus forming a low resistance, reliable bond. Since such metal-to-metal contact may not in itself make a sufficiently strong bond to hold the silicon member in place on the glass substrate after anisotropic etching, typically the silicon members are extended beyond the contact points a sufficient distance to form a region in which the silicon is anodically bonded to the glass, either directly or through a metal spacer as described above.

A silicon wafer is aligned over the glass substrate wafer. The silicon wafer is selectively passivated to define a plurality of silicon elements (beams, bridges, etc.). That is, the selective passivation is so patterned as to produce the silicon elements (and any other silicon features, such as a silicon frame partially or entirely encircling the air flow opening, etc.) by subsequent anodic etching. Specifically, a passivation layer of oxide and/or nitride is grown on both sides of the silicon wafer. The passivation is then selectively removed on the top surface of the wafer to allow subsequent anisotropic etch formation of the silicon components of the sensor. The passivation is also selectively removed on the bottom side of the wafer at the ends of the silicon members to permit anodic boning to the glass substrate wafer. The resistive metal film preferably is deposited on the bottom surface of the silicon wafer, corresponding to the leeward side in the finished sensor device. If necessary, the metalization is passivated with a film of silicon nitride or the like and the passivation selectively removed over the contact pads.

Preferably, the silicon elements are beam elements having a trapezoidal cross-section, first beam portion positioned over an end portion of its corresponding peninsula and a second beam portion extending over its corresponding air flow opening. The lower surface of the silicon wafer is selectively metalized in a pattern providing a plurality of resistive elements, preferably U-shaped resistive film segments, corresponding to the plurality of silicon beams. Thus, each such film segment would extend from a first beam contact pad aligned over its corresponding electrical lead contact point on the glass surface to the second beam portion aligned over the air flow opening and back to a second beam contact pad aligned over the corresponding second electrical contact point on the glass surface. Preferably, each of the silicon beam elements also has a bonding zone in its first beam portion which is anodically bondable to the underlying surface of the glass substrate wafer. A bonded assembly is formed by anodically bonding the silicon wafer to the glass substrate wafer at its bondable areas, including at least the bonding sites of the silicon beams and, if any, the silicon frames, etc. An etched assembly is then formed by contacting the bonded assembly with an anisotropic etching solution to etch away the unwanted portions of the silicon wafer, leaving the silicon beams, frames, etc. bonded to the glass substrate wafer. Such anodic bonding and anisotropic etching steps are carried out in accordance with materials and techniques well known to those skilled in the art of sensor and IC manufacture. The resultant etched assembly is then divided into individual, substantially identical mass air flow sensor components.

In accordance with a second preferred version of the method of the invention, a batch manufacturing method for making a plurality of substantially identical mass air flow sensor components comprises the steps described for the previous embodiment with respect to providing a glass substrate wafer and a silicon wafer. The surface of the glass substrate wafer, however, is not metalized. Rather, the bottom surface of the silicon wafer is metalized to provide not only the resistive films which will be carried by the silicon member over the air flow opening, but also the electrically conductive leads from the resistive films to wire bonding pads. Thus, the upper surface of the silicon wafer is selectively passivated to define the silicon elements, preferably silicon beams and optionally silicon frames, corresponding to the peninsulas and air flow openings of the glass substrate wafer. The bottom surface of the silicon wafer is selectively unpassivated and metalized in a pattern comprising the resistive film segments, preferably U-shaped film segments corresponding to the silicon elements which will extend over the air flow opening. As noted above, the metalization pattern on the bottom surface of the silicon wafer further provides the electrically conductive leads. Preferably aluminum is used for this second metalization step. Thus, aluminum leads are formed comprising an electrical contact pad overlapping a corresponding contact pad of a resistive film and a wire bonding pad remote therefrom. The exact configuration of the aluminum leads will depend, of course, on the particular design and intended application of the finished device. The bottom surface of the silicon wafer further provides a bonding zone for each silicon element. Preferably, such bonding zone is also metalized with an aluminum film. Such film forms no part of the circuitry of the device; rather, it acts as a spacer to compensate for the height of the electrical lead and resistive film which also are sandwiched between the silicon member and the surface of the glass substrate. Upon anodic bonding, a silicon/aluminum/glass mechanical bond is formed at the bonding zone. In embodiments of the invention wherein such aluminum spacer film is used, the silicon element need not extend as far over the glass substrate beyond the point where it is lifted by the intersection of the resistive film and electrical leads, since the aluminum fills the gap otherwise existing between the silicon and the glass surfaces.

A bonded assembly is then formed by anodically bonding the silicon wafer to the glass substrate wafer as described above. In this embodiment, however, the aluminum leads also are bonded during this step to the surface of the glass substrate wafer. At least one area of the aluminum lead metalization contacts the silicon so that the leads are bonded to the glass during the anodic bonding step. Alternatively, however, anodic bonding of the silicon member to the glass substrate is not used. Rather, the strength of the bond between the aluminum and the silicon nitride passivating layer is relied upon to hold the silicon member in place through the subsequent anisotropic etching step. Subsequently, means are employed, for example, epoxy or a glaze, at the beam/glass interface to hold the assembly in place. In fact, epoxy may be necessary in certain applications for bond strength even with the glass/aluminum/silicon bond.

In accordance with a third preferred embodiment of the method of the invention, batch manufacturing proceeds with a glass substrate wafer and a silicon wafer substantially as described above. The upper surface of the silicon wafer, however, is metalized, to provide the resistive thin film. In this version of the invention the contact points at the ends of the resistive film are exposed following the anisotropic etching step. Wire bonding pads can be provided on a silicon frame element. This is particularly advantageous where the silicon frame element is extended to incorporate associated IC circuitry for the sensor. The resistive thin films of the silicon elements extending over the air flow opening would be connected, preferably by gold wire, to the wire bond pads on the frame member. The wire bond pads would, in turn, be connected by electrically conductive leads to such IC circuitry. In embodiments wherein the surface of the glass is metalized and a frame member is provided, the electrical contact pads of the electrical leads on the surface of the glass substrate wafer should be inside the frame member such that gold wire connections between the resistive thin film and the electrical contact pads of the leads need not extend over the frame member. Connections made by gold wire, preferably thermosonically bonded, typically are formed after the anisotropic etching step.

The various preferred versions or embodiments of the invention described in detail above are intended only to illustrate the invention. Those skilled in the art will recognize from this disclosure that modifications, additions and substitutions can be made in the various features and elements without departing from the true scope and spirit of the invention. The following claims are intended to cover the true scope and spirit of the invention.

We claim:

1. A mass air flow sensor comprising:
   a generally planar glass substrate having an upper surface, a lower surface and an air flow opening formed therethrough perpendicular to the plane of the substrate;
   a first silicon member having a bottom surface, a portion of the first silicon member extending over the air flow opening and a portion of the bottom surface of the first silicon member being bonded at a bonding site to an underlying portion of the upper surface of the glass substrate; and
   an electrically heatable element comprising a resistive film on the first silicon member.

2. The mass air flow sensor of claim 1 wherein the first silicon member is a silicon beam cantilevered over the air flow opening.

3. The mass air flow sensor of claim 1 wherein the glass substrate has a peninsula extending into the air flow opening, the first silicon member being a beam of silicon cantilevered over the air flow opening from said bond site on the upper surface of the peninsula, the mass air flow sensor further comprising
   a first electrically conductive lead extending on the upper surface of the glass substrate from electrical contact with the resistive film at a first electrical contact point on the peninsula to a first wire bond pad remote from the peninsula, and
   a second electrically conductive lead extending on the upper surface of the glass substrate from electrical contact with the resistive film at a second electrical contact point on the peninsula to a second wire bond pad remote from the peninsula.

4. The mass air flow sensor of claim 1 wherein the resistive film consists essentially of metal selected from the group consisting of nickel and platinum.

5. The mass air flow sensor of claim 1 further comprising:
   a second silicon member having a bottom surface, a portion of the second silicon member extending over the air flow opening and a portion of the bottom surface of the second silicon member being bonded at a second bonding site to an underlying portion of the upper surface of the glass substrate; and
   a second electrical element comprising a second resistive film on the second silicon member.

6. The mass air flow sensor of claim 1 further comprising a passivating coating on the first silicon member and the glass substrate.

7. The mass air flow sensor of claim 1 wherein the first silicon member is a silicon beam which bridges the air flow opening.

8. The mass air flow sensor of claim 7 wherein each end of the silicon beam is bonded to the upper surface of the glass substrate on opposite sides of said air flow opening.

9. A mass air flow sensor comprising:
   a generally planar glass substrate having an upper surface, a lower surface and an air flow opening formed therethrough;
   a first silicon member having a bottom surface, a portion of the first silicon member extending over the air flow opening and a portion of the bottom surface of the first silicon member being bonded at a bonding site to an underlying portion of the upper surface of the glass substrate; and an electrically heatable element comprising a resistive film on the first silicon member wherein the first silicon member is a silicon beam having a trapezoidal cross-section, being wider at the bottom surface than at the top surface, the resistive film being on the bottom surface.

10. A mass air flow sensor comprising:
    a generally planar glass substrate having an upper surface, a lower surface and an air flow opening formed therethrough;
    a first silicon member having a bottom surface, a portion of the first silicon member extending over the air flow opening and a portion of the bottom surface of the first silicon member being bonded at a bonding site to an underlying portion of the upper surface of the glass substrate;
    an electrically heatable element comprising a resistive film on the first silicon member; and
    a silicon frame spaced from the first silicon member and bonded to the upper surface of the glass substrate around the air flow opening.

11. A mass air flow sensor comprising:

a generally planar glass substrate having an upper surface, a lower surface and an air flow opening formed therethrough, a first peninsula and a second peninsula of the glass substrate extending generally parallel each other into the air flow opening;

a first electrically conductive lead extending on the upper surface of the glass substrate from a first electrical contact point on the first peninsula to a first wire bond pad remote therefrom;

a second electrically conductive lead extending on the upper surface of the glass substrate from a second electrical contact point on the first peninsula to a second wire bond pad remote therefrom;

a third electrically conductive lead extending on the upper surface of the glass substrate from a third electrical contact point on the second peninsula to a third wire bond pad remote therefrom;

a fourth electrically conductive lead extending on the upper surface of the glass substrate from a fourth electrical contact point on the second peninsula to a fourth wire bond pad remote therefrom;

a first silicon beam having a planar top surface, a planar bottom surface wider than its top surface and a trapezoidal cross-section, a portion of the bottom surface of the first silicon beam being bonded at a first bonding site on the first peninsula to an underlying portion of the upper surface of the glass substrate, covering the first and second electrical contact points, and a free end of the first silicon beam being cantilevered over the air flow opening;

a first resistive element comprising an elongate metal resistive thin film extending on the bottom surface of the first silicon beam from electrical contact with the first electrically conductive lead at the first electrical contact point toward the free end of the first silicon beam and back to electrical contact with the second electrically conductive lead at the second electrical contact point;

a second silicon beam having a planar top surface, a planar bottom surface wider than its top surface and a trapezoidal cross-section, a portion of the bottom surface of the second silicon beam being bonded at a second bonding site on the second peninsula to an underlying portion of the upper surface of the glass substrate, covering the third and fourth electrical contact points, and a free end of the second silicon beam being cantilevered over the air flow opening;

a second resistive element comprising an elongate metal resistive thin film extending on the bottom surface of the second silicon beam from electrical contact with the third electrically conductive lead at the third electrical contact point toward the free end of the second silicon beam and back to electrical contact with the fourth electrically conductive lead at the fourth electrical contact point; and a silicon frame bonded to the upper surface of the glass substrate around the air flow opening remote from the first silicon beam and the second silicon beam, the silicon frame having a top surface coplanar with the top surface of the first silicon beam and the top surface of the second silicon beam.

* * * * *